INVENTORS
HENRY W. KIRCHER
THOMAS J. JACKS

3,553,235
7-ACYLOXY-4-METHYL-COUMARINS

Henry W. Kircher, Tucson, Ariz., and Thomas J. Jacks, Metairie, La., assignors to the United States of America as represented by the Secretary of Agriculture
Filed Sept. 30, 1968, Ser. No. 763,727
Int. Cl. C07d 7/28
U.S. Cl. 260—343.2
5 Claims

ABSTRACT OF THE DISCLOSURE

This invention describes the synthesis of five fatty acyl esters. More particularly, this invention describes the synthesis of five fatty acyl esters of 4-methylumbelliferone. Still more particularly, this invention describes the synthesis of five fatty acyl esters of 4-methylumbelliferone and their use as fluorogenic substrates to continuously follow the hydrolytic activity of carboxylesterases, such as acid and alkaline lipases.

---

Figure 1:
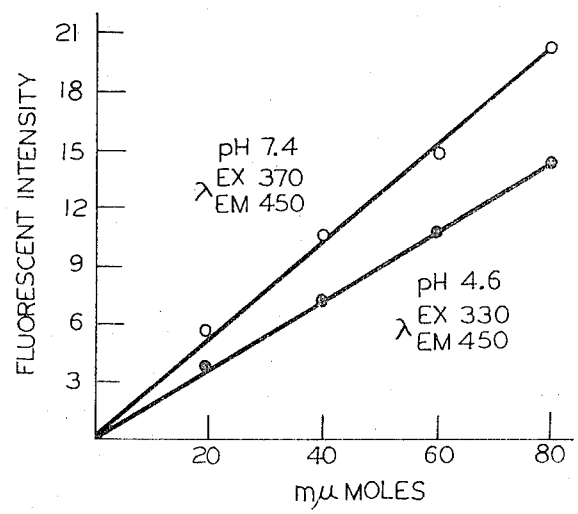

A non-exclusive, irrevocable, royalty-free license in the invention herein described throughout the world for all purposes of the United States Government, with the power to grant sublicenses for such purposes, is hereby granted to the Government of the United States of America.

An object of the present invention is to provide a method for preparing at will some fatty acyl esters of 4-methylumbelliferone for use as fluorogenic substrates to continuously follow the hydrolytic activity of carboxylesterases, such as acid and alkaline lipases.

In the past few years methods for the analysis of biological systems have become increasingly important. A large number of these analytical methods which employ enzymes as reagents, or which measure the activity of certain enzymes, require photometric or fluorometric techniques to determine the amount of activity. One of the most sensitive of these new techniques is the fluorometric analysis of enzyme activity on fluorogenic substrates.

Four-methylumbelliferone (4-MU) and other coumarin derivatives are used as "brighteners" in certain laundry detergents. The acylated derivatives of 4-MU do not fluoroesce. Therefore, if fatty acyl esters of 4-MU could be synthesized, these might serve as specific substrates for fluorometric analysis of lipase or carboxylesterase activity in biological materials.

Ten milliliters of dry pyridine containing 2 grams of 4-MU were mixed with a 100% excess of acyl chloride of heptanoic, octanoic, nonanoic, palmitic, or oleic acids. The mixture was held at 70° C. for an hour, cooled, diluted with 20 milliliters of water and added to 100 milliliters of ether. After the ether layer was extracted several times with water the ether was allowed to evaporate. The product was crystallized from methanol or methanol-acetone and then recrystallized from hexane, heptane, octane, or any similar solvent after decolorization with charcoal. The melting points and analyses of the product are given in Table 1. The fluorescent intensities of the esters were negligible compared to that exhibited by 4-MU at the same concentration.

Hydrolysis of the acylated 4-MU derivative catalyzed by the lipase preparations was follower continuously by monitoring for one or two minutes the increase of the fluorescent intensity of the enzyme reaction mixture due to the production of free 4-MU. For alkaline lipases the reaction mixture (6 ml.) contained 1.06 millimoles of tris-HCl buffer (pH 7.4), 0.6 micromoles of substrate and, to start the reaction, enzyme preparation. Hydrolytic activity of the acid lipases in storage tissues of oleaginous seeds such as ungerminated castor bean endosperm [Ory, R. L., St. Angelo, A. J., and Altschul, A. M., J. Lipid Res. 3, 99 (1962)] and germinated peanut cotyledon [St. Angelo, A. J., and Altschul, A. M., Plant Physiol. 39, 880 (1964)] was determined as above except that 1.06 millimoles of acetate buffer (pH 4.6) was substituted for the tris-HCl buffer. Under conditions of the assay the esters did not hydrolyze in the absence of enzyme; however, at pH 10.4 (1.06 moles of bicarbonate buffer) non-enzymic hydrolysis was observed.

Fresh stock preparations of the substrate were made by dissolving the appropriate amount of acylated 4-MU in 1.5 ml. of methylcellosolve and diluting to 25 ml. with distilled water for a final concentration of $1 \times 10^{-3}$ M ester. In these preparations the palmitoyl ester was at best only partially soluble; the other esters formed homogeneous emulsions upon the addition of water except the butyryl ester which slowly crystallized from the clear solution.

An automated, recording Farrand spectrofluorometer was used for all measurements of fluorescence. For reproducibility the detection of fluorescent intensity was standardized with quinine sulfate each day.

The exciting and emitting monochromatic wavelengths of 4-MU were determined at three pH values. The emitting wavelength is 450 m$\mu$ at each pH whereas the exciting wavelength is 330 m$\mu$ at pH 4.6, 370 m$\mu$ at pH 7.4, 385 m$\mu$ at pH 10.4. At pH 4.6 to 10.4 the fluorescent intensity of a 4-MU is ten to twenty times that of the same molar concentration of quinine sulfate.

FIG. 1 shows that the fluorescent intensity of 4-MU increases linearly as the concentration of 4-MU increases and that the intensity is dependent on the pH of the medium. Goodwin and Kavanagh [Goodwin, R, N., and Kavanagh, F., Arch. Biochem. 27, 152 (1950)] showed that the maximum intensity of the fluorescence of 4-MU is obtained above pH 10. We fined that the fluorescent intensity at pH 10.4 is 36% greater than the intensity at pH 7.4 and 90% greater than at pH 4.6.

The measurement of the activity of lipase is based on detection of the fluoroescence of 4–MU produced by enzymic hydrolysis of acylated 4–MU. This activity can be defined as the increase in fluoroescent intensity per unit time or, with a standard curve as given in FIG. 1, as the production of 4–MU catalized by the enzyme per unit time. With the former definition suitable corrections must be applied to compare hydrolytic activities at different pH values since the fluoroescent intensity of 4–MU is a function of pH [Goodwin, R. N., and Kavanaugh, F., Arch. Biochem. 27, 152 (1959)]. The effect of pH on the wavelength of excitation should also be considered in such studies.

To ascertain the suitability of acylated 4–MU derivatives as substrates from the determination of the catalytic activity of lipase, five lipase preparations, three of these commercial, were tested for hydrolytic activity toward seven acylated derivatives of 4–MU. Porcine pancreatic, wheat and steapsin lipases were prepared as 0.1% suspensions in 0.2 M tris-HCl buffer (pH 7.4) by hand homogenation at 0° C. castor bean lipase as 0.1% suspension in 0.05 M tris-HCl buffer (pH 7.4). Peanut lipase was prepared from germinating cotyledons.

Figure 2:
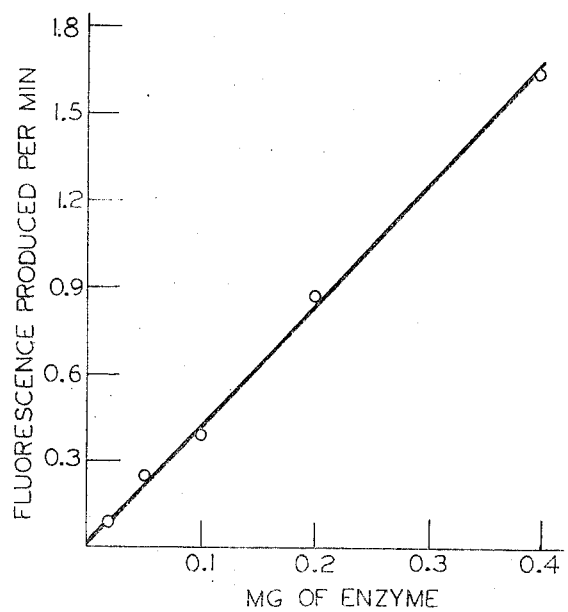

The initial rates of hydrolysis, as determined spectrofluorometrically, are linear, and proportionality is observed between the initial rates the amounts of enzyme when enzyme is rate limiting. FIG. 2 illustrates the latter for the hydrolysis of the octanoyl ester by porcine pancreatic lipase.

The rate of hydrolysis of the heptanoyl ester by each lipase preparation was compared to its rate with the other esters. The results, shown in Table 2, are concordant to the findings that generally maximal rates of catalysis are achieved with esterified acids of medium chain length and with emulsified rather than soluble esters. In this system the hexanoyl, heptanoyl, octanoyl, and nonanoyl derivatives of 4-MU are emulsions of medium chain fatty acyl esters. Our results also confirm the observation that lipase catalyzes the hydrolysis of other than glycerol esters suggesting that catalysis occurs irrespective of the alcohol moiety of the ester.

The increase in fluorescent intensity due to the enzymic hydrolysis of dibutyryl fluorescein at pH 4.6 or 7.4 was compared to that due to the hydrolysis of heptanoyl 4-MU. The rate of increase with dibutyryl fluorescein, measured by the spectrofluorometric procedure of Guilbault and Kramer [Guilbault, G. G., and Kramer, D. N., Anal. Biochem. 14, 28 (1966)], was 4% or less of the rate obtained with heptanoyl 4-MU. It was not determined whether the rate of dibutyryl fluorescein was slower because fluorescein was disubstituted.

To illustrate the practicality of our procedure with acylated 4-MU, the specific activity and Michaelis constant ($K_m$) was determined for the catalyzed hydrolysis of heptanoyl 4-MU by each of the enzyme preparations. The initial rates of hydrolysis were linear and satisfactory Michaelis-Menton kinetics were observed; the values of $K_m$ and the specific activities are shown in Table 3. It is of interest to compare the value of $K_m$ for heptanoyl 4-MU obtained with castor bean lipase to the value for the hydrolysis of a "natural" substrate. From the data of Ory, [Ory, R. L., St. Angelo, A. J., and Altschul, A. M., J. Lipid Res. 3, 99 (1962)] the value for the hydrolysis of cotton seed oil is calculated at approximately 0.1 M compared to $1 \times 10^{-5}$ M obtained for heptanoyl 4-MU (Table 3). If the value of the $K_m$ were equivalent to the true dissociation constant for the enzyme-substrate complex, the affinity of castor bean lipase for heptanoyl 4-MU would be about ten thousand-fold greater than for triglyceride.

EXAMPLE 1

Ten milliliters of dry pyridine containing 2 grams of 4-methylumbelliferone were mixed with a 100% excess of butyric anhydride. The mixture was held at 70° C. for an hour, cooled, diluted with 20 milliliters of water, and added to 100 milliliters of ether. After the ether layer was extracted several times with water the ether was allowed to evaporate. The product was crystallized from methanol or methanol-acetone and then recrystallized from hexane, heptane, octane, or any similar solvent after decolorization with charcoal. The melting point and analyses of the product are given in Table 1. The fluorescent intensities of the ester were negligible compared to that exhibited by 4-methylumbelliferone at the same concentration.

EXAMPLE 2

Ten milliliters of dry pyridine containing 2 grams of 4-methylumbelliferone were mixed with a 100% excess of acyl chloride of hexanoic acid. The mixture was held at 70° C. for an hour, cooled, diluted with 20 milliliters of water, and added to 100 milliliters of ether. After the ether layer was extracted several times with water the ether was allowed to evaporate. The product was crystallized from methanol or methanol-acetone and then recrystallized from hexane, heptane, octane, or any similar solvent after decolorization with charcoal. The melting point and analyses of the product are given in Table 1. The fluorescent intensities of the esters were negligible compared to that exhibited by 4-methylumbelliferone at the same concentration.

EXAMPLE 3

Ten milliliters of dry pyridine containing 2 grams of 4-methylumbelliferone were mixed with a 100% excess of acyl chloride of heptanoic acid. The mixture was held at 70° C. for an hour, cooled, diluted with 20 milliliters of water, and added to 100 milliliters of ether. After the ether layer was extracted several times with water, the ether was allowed to evaporate. The product was crystallized from methanol or methanol-acetone and then recrystallized from hexane, heptane, octane, or any similar solvent after decolorization with charcoal. The melting point and analyses of the product are given in Table 1. The fluorescent intensities of the esters were negligible compared to that exhibited by 4-methylumbelliferone at the same concentration.

EXAMPLE 4

Ten milliliters of dry pyridine containing 2 grams of 4-methylumbelliferone were mixed with a 100% excess of acyl chloride of octanoic acid. The mixture was held at 70° C. for an hour, cooled, diluted with 20 milliliters of water, and added to 100 milliliters of ether. After the ether layer was extracted several times with water, the ether was allowed to evaporate. The product was crystallized from methanol or methanol-acetone and then recrystallized from hexane, heptane, octane, or any similar solvent after decolorization with charcoal. The melting point and analyses of the product are given in Table 1. The fluorescent intensities of the esters were negligible compared to that exhibited by 4-methylumbelliferone at the same concentration.

EXAMPLE 5

Ten milliliters of dry pyridine containing 2 grams of 4-methylumbelliferone were mixed with a 100% excess of acyl chloride of nonanoic acid. The mixture was held at 70° C. for an hour, cooled, diluted with 20 milliliters of water, and added to 100 milliliters of ether. After the ether layer was extracted several times with water, the ether was allowed to evaporate. The product was crystallized from methanol or methanol-acetone and then recrystallized from hexane, heptane, octane, or any similar solvent after decolorization with charcoal. The melting point and analyses of the product are given in Table 1. The fluorescent intensities of the esters were negligible compared to that exhibited by 4-methylumbelliferone at the same concentration.

EXAMPLE 6

Ten milliliters of dry pyridine containing 2 grams of 4-methylumbelliferone were mixed with a 100% excess of acyl chloride of palmitic acid. The mixture was held at 70° C. for an hour, cooled, diluted wtih 20 milliliters of water, and added to 100 milliliters of ether. After the ether layer was extracted several times with water, the ether was allowed to evaporate. The product was crystallized from methanol or methanol-acetone and then recrystallized from hexane, heptane, octane, or any similar solvent after decolorization with charcoal. The melting point and analyses of the product are given in Table 1. The fluorescent intensities of the ester were negligible compared to that exhibited by 4-methylumbelliferone at the same concentration.

EXAMPLE 7

Ten milliliters of dry pyridine containing 2 grams of 4-methylumbelliferone were mixed with a 100% excess of acyl chloride of oleic acid. The mixture was held at 70° C. for an hour, cooled, diluted with 20 milliliters of water, and added to 100 milliliters of ether. After the ether layer was extracted several times with water, the ether was allowed to evaporate. The product was crystallized from methanol or methanol-acetone and then recrystallized from hexane, heptane, octane, or any similar solvent after decolorization with charcoal. The melting point and analyses of the product are given in Table 1. The fluorescent intensities of the ester were negligible compared to that exhibited by 4-methylumbelliferone at the same concentration.

EXAMPLE 8

Hydrolysis of the acylated 4-MU derivatives catalyzed by the lipase preparations was followed continuously by monitoring for one or two minutes the increase of the fluorescent intensity of the enzyme reaction mixture due to the production of free 4-MU. For alkaline lipases the reaction mixture (6 ml.) contained 1.06 millimoles of tris-HCl buffer (pH 7.4), 0.6 micromoles of substrate and to start the reaction, enzyme preparation. Hydrolytic activity of the acid lipases in storage tissues oleaginous seeds such as ungerminated castor bean and germinated peanut cotyledon was determined as above except that 1.06 millimoles of acetate buffer (pH 4.6) was substituted for the tris-HCl buffer. Under conditions of the assay the esters did not hydrolyze in the absence of enzymes, however, at pH 10.4 (1.06 millimoles of bicarbonate buffer) nonenzymic hydrolysis was observed.

Fresh stock preparations were made by dissolving the appropriate amount of acylated 4-MU in 1.5 milliliters of methylcellosolve and diluting to 25 milliliters with distilled water for a final concentration of $1 \times 10^{-3}$ M ester. An automated, recording Farrand spectrofluorometer was used for all measurements of fluorescence. The exciting and emitting wavelengths of 4-MU were determined at three pH values. The emitting wavelength is 450 m$\mu$ at each pH whereas the exciting wavelength is 330 m$\mu$ at pH 4.6, 370 m$\mu$ at pH 7.4, 385 m$\mu$ at pH 10.4. At pH 4.6 to 10.4 the fluorescent intensity of a 4-MU is ten to twenty times that of the same molar concentration of quinine sulfate. FIG. 1 shows that the fluorescent intensity of 4-MU increases linearly as the concentration of 4-MU increases and that the intensity is dependent on the pH of the medium. We find that the fluorescent intensity of pH 10.4 is 36% greater than the intensity of pH 7.4 and 90% greater than at pH 4.6. The measurement of the activity of lipase is based on detection of the fluorescence of 4-MU produced by enzymic hydrolysis of acylated 4-MU.

TABLE 1.—PROPERTIES OF THE ESTERS OF 4-METHYL-UMBELLIFERONE

| Ester | Melting point, °C. | Found, percent | | Calculated, percent | |
|---|---|---|---|---|---|
| | | C | H | C | H |
| Butyryl | a 91–92.5 | | | | |
| Hexanoyl | b 70–72 | | | | |
| Heptanoyl | 41–42 | 70.99 | 6.98 | 70.82 | 6.99 |
| Octanoyl | 43–44 | 71.45 | 7.35 | 71.50 | 7.33 |
| Nonanoyl | 47–49 | 72.12 | 7.60 | 72.13 | 7.64 |
| Palmitoyl | 70–72 | 75.30 | 9.36 | 75.33 | 9.23 |
| Oleoyl | 38–40 | 76.08 | 9.12 | 76.33 | 9.14 | a Melting point 91°(7).
b Melting point 72°(7).

TABLE 2.—EFFECT ON THE ACYL MOIETY ON RATE OF ENZYMIC HYDROLYSIS a

| Ester | Porcine | Wheat | Steapsin | Castor | Peanut |
|---|---|---|---|---|---|
| Butyryl | 34 | 56 | 27 | 27 | 39 |
| Hexanoyl | 81 | 93 | 128 | 60 | 94 |
| Heptanoyl | 100 | 100 | 100 | 100 | 100 |
| Octanoyl | 103 | 78 | 95 | 110 | 65 |
| Nonanoyl | 120 | 67 | 82 | 36 | 26 |
| Palmitoyl | 3 | 1 | 1 | 0 | 6 |
| Oleoyl | 6 | 0 | 1 | 0 | 0 | a Rate of hydrolysis was determined as described in the text. The rate with the heptanoyl ester was set at 100 for each enzyme preparation.

TABLE 3.—SPECIFIC ACTIVITIES AND MICHAELIS CONSTANTS FOR ENZYMIC HYDROLYSIS OF HEPTANOYL 4-METHYLUMBELLIFERONE a

| | $K_m$ value (M) | Specific activity |
|---|---|---|
| Enzyme: | | |
| Steapsin | $2.5 \times 10^{-6}$ | 5.5 |
| Wheat germ | $2.7 \times 10^{-6}$ | 0.1 |
| Porcine pancreas | $3.3 \times 10^{-6}$ | 1.9 |
| Castor bean | $10.0 \times 10^{-6}$ | b 0.1 |
| Peanut | | b, c 2.1 | a Specific activity was estimated from the initial rate of hydrolysis measured as described in the text and is defined as the increase in fluorescent intensity per 30 sec. per mg. of enzyme. Conditions of reaction to obtain the value of $K_m$ were the same as above except that the amount of substrate varied from 0.5 m$\mu$mole to 60 m$\mu$moles.
b Corrected to pH 7.4 (1.4×activity at pH 4.6).
c Activity per ml. of enzyme preparation.

We claim:
1. A compound represented by the formula

[chemical structure of 4-methylumbelliferone ester]

where R=CH$_3$(CH$_2$)$_5$C(=O)—

2. A compound represented by the formula

[chemical structure]

where R=CH$_3$(CH$_2$)$_6$C(=O)—

3. A compound represented by the formula

[chemical structure]

where R=CH$_3$(CH$_2$)$_7$C(=O)—

4. A compound represented by the formula

[chemical structure]

where R=CH$_3$(CH$_2$)$_7$CH=CH—(CH$_2$)$_7$C(=O)

5. A compound represented by the formula

[chemical structure]

where R=CH$_3$(CH$_2$)$_{14}$C(=O)

References Cited

UNITED STATES PATENTS 2,895,964   7/1959   Emerson et al. _____ 260—343.2
3,445,455   5/1969   Kiss et al. _____ 260—343.2X HENRY R. JILES, Primary Examiner J. M. FORD, Assistant Examiner U.S. Cl. X.R.

252—301.2